United States Patent [19]
Hunt et al.

[11] 3,875,304
[45] Apr. 1, 1975

[54] LIVESTOCK FEED COMPOSITION AND METHOD OF PREPARING THE SAME

[75] Inventors: Lenard A. Hunt, Elm Grove; Eugene H. Spitzer, Burlington, both of Wis.

[73] Assignee: Jos. Schlitz Brewing Co., Milwaukee, Wis.

[22] Filed: Nov. 2, 1972

[21] Appl. No.: 303,076

Related U.S. Application Data

[63] Continuation-in-part of Ser. No. 31,797, April 24, 1970, abandoned.

[52] U.S. Cl............... 426/31, 426/54, 426/74, 426/807
[51] Int. Cl............................................ A23k 1/06
[58] Field of Search............ 99/5, 8 R, 8 E, 8 D, 9; 426/31, 52, 53, 54, 74, 807, 210, 204

[56] References Cited
UNITED STATES PATENTS

| | | | |
|---|---|---|---|
| 3,150,979 | 9/1964 | Ensley | 99/9 |
| 3,172,764 | 3/1965 | Biehl | 99/9 |
| 3,212,902 | 10/1965 | Bavisotto | 99/9 |
| 3,246,989 | 4/1966 | Biehl | 99/8 |
| 3,443,956 | 5/1969 | Muller et al. | 99/8 |

OTHER PUBLICATIONS

Seiden et al., Handbook of Feedstuffs, 1957, pp. 430–431, Springer Publishing Company, Inc. New.

*Primary Examiner*—Norman Yudkoff
*Assistant Examiner*—Curtis P. Ribando
*Attorney, Agent, or Firm*—Andrus, Sceales, Starke & Sawall

[57] ABSTRACT

A livestock feed silage composition composed of brewers wet grain, mineral supplements and a carbohydrate source such as dry feed grains. The feed silage composition may also include, in addition, brewers autolyzed yeast and/or roughage. The brewers wet grain used in the silage composition is to have some of its moisture removed prior to blending with the other ingredients, so that the blended silage composition has a moisture content in the range of 35 to 58 percent by weight. The silage composition is fermented under essentially anaerobic conditions and in a controlled manner due to the presence of the mineral supplement which not only supplies essential nutrient balance to the silage composition, but provides also a buffering action during fermentation which controls the pH of the fermented silage feed mixture in the range of 4.0 to 4.5. This imparts good keeping quality to the silage composition and provides improved palatability to the resulting fermented mixture which may be used by itself or with other nutrients and feed materials as a livestock feed.

9 Claims, No Drawings

LIVESTOCK FEED COMPOSITION AND METHOD OF PREPARING THE SAME

This application is a continuation-in-part of application Ser. No. 31,797, filed Apr. 24, 1970, now abandoned, and entitled Livestock Feed Composition and Method of Preparing the Same.

BACKGROUND OF THE INVENTION

1. Field

This invention relates to a livestock silage feed composition utilizing brewers feed by-products as the principal course of protein, to a method of fermenting and preserving the silage feed composition, and to the resulting fermented livestock feed composition.

2. Prior Art

Brewers wet grain is the residue produced as a by-product of the mashing operation in the brewing process. Brewers wet grains consists primarily of husks, cellular wall structures of the original brewing grain, fat materials, and residual proteins and minerals. In general, brewers wet grain is relatively high in protein content and low in carbohydrate content. The mineral content of brewers wet grain is depleted and unbalanced as a livestock feed as a result of the brewing process in which the soluble minerals have been substantially removed.

Brewers wet grain normally contains 80 to 90 percent moisture when the brewery mashing process is completed. This moisture content is too high for efficient direct utilization as livestock feed, and the high moisture renders the feed unsuitable for efficeint and satisfactory preservation beyond a few days storage. Brewers wet grain preserved with high moisture content (80 to 90 percent) tends to become excessively sour in storage, loses nutritional value through leaching and run-off, and undergoes spoilage and loss of quality and palatability as livestock feed.

Drying the brewers wet grains is a usual prior art method employed to preserve perishable wet grains from time of production until time of use as livestock feed. This method of preserving and using brewers grain as feed has the problems of adding cost to the feed product, and failing to correct nutritional imbalance and deficiencies which exist in untreated brewers grains.

SUMMARY OF THE INVENTION

The present invention is directed to a novel livestock feed composition produced by the anaerobic fermentation of a silage feed composition comprising an intimate mixture of brewers wet grain, a mineral supplement and a feed grain or other suitable source of carbohydrate. Autolyzed yeast and roughage materials also may be added to the silage composition prior to the fermentation.

The present livestock feed composition and the novel method for its preparation overcome the problems associated with the use of brewers feed by-products in the past and offer a number of important advantages. This invention provides a method of controlling moisture content of the silage feed mixture within the parameters of balanced nutritional requirements for livestock feed. This invention further provides the basis for controlling the silage fermentation process so that the resulting silage feed has good aroma, palatability, digestibility, and keeping quality. In addition, the nutritional value of brewers grain and the other feed ingredients used in the mixture are actually enhanced and improved as a result of the silage fermentation process of preserving and storing the feed composition.

DESCRIPTION OF THE PREFERRED EMBODIMENT

1. Preparation of feed silage composition

The first step in the process of the present invention is the formation of an intimate mixture of the ingredients of the feed silage composition which is to be subjected to controlled fermentation under anaerobic conditions.

The essential ingredients of the feed silage composition are (1) brewers wet grain, (2) a source of carbohydrates such as dry feed grain, and (3) a mineral supplement. Brewer's wet grain is the residue produced as a by-product of the mashing operation in the brewing process and as such is a water cooked product. Being a water cooked product, the physical characteristics of the brewer's wet grain differ from uncooked natural protein sources, and dry cooked products, for during the cooking, water soluble constituents are leached from the grain resulting in a depletion of the mineral content. Furthermore, the cellular structure of brewer's wet grain is broken down during malting and brewery processing, resulting in a product that is less retentive of moisture than uncooked products of other silage composition.

The brewer's grain normally has a moisture content of 80 to 90 percent by weight after completion of the mashing operation in the brewing process, and it is to be initially dewatered down to 65 to 70 percent water by weight (such as by pressing, squeezing, centrifugation, or other suitable mechanical means) before it is combined with the other ingredients of the food silage composition. It is an important feature of the invention that the brewer's wet grain be initially reduced in moisture content before it is mixed with the carbohydrate source and mineral supplement so that it has a moisture content less than about 70 percent by weight. In order to obtain desired fermentation, the moisture content of the mixture, including the brewer's wet grain, carbohydrate source and mineral supplement should be below 58 percent and preferably in the range of 35 to 58 percent by weight. Moisture content higher than about 58% in the brewer's wet grain silage mixture results in the silage being of poorer quality from the standpoint of nutritional value, aroma, animal acceptance, and animal performance. Furthermore, moisture content of the mixture higher than about 58 percent will leach or drain excess moisture away from the silage, carrying with it soluble nutrient material resulting in loss of nutritional value.

Alternate methods of obtaining a moisture content less than 58 percent in the blend of feed ingredients such as using a higher proportion of the dry feed ingredient, or dehydrating the silage composition after mixing are not satisfactory. Using higher proportions of the carbohydrate source to reduce the moisture content of the blend will adversely affect the proper nutritional relationship of carbohydrate and protein in the finished feed composition. Dehydrating the mixed composition before fermentation by mechanical separation will result in loss of mineral buffering and nutritional ingredients in the effluent. Dehydrating the composition before fermentation by heat drying is not accpetable, due to the prohibitive economics and adverse effects of heat on digestibility of starch and proteins.

Dehydrating the silage composition after fermentation by mechanical methods will result in the loss of mineral nutrients and soluble fermentation by-products, such as fatty acids, amino acids, and soluble carbohydrates in the effluent. Dehydrating the fermented silage by means of heat drying is not an acceptable alternative, because of the loss of volatile fatty acids produces during fermentation and the denaturization or complexing of starch and protein constituents which results in loss of nutritional value. Thus, the step of initially reducing the moisture content of the brewer's wet grain to a value below 70 percent prior to mixing with the other constituents is an important step in the overall process.

The carbohydrate source is typically a dry feed grain such as corn, wheat, barley, oats, milo, or hominy; screenings; mill feed; citrus pulp; manioca; tapioca; etc., which have been previously ground, crimped or cracked to break the kernels.

The mineral supplement for use in the silage feed blend is determined on the basis of two criteria, which are (a) supplement the level of deficient minerals for which minimum nutritional requirments have been established, and (b) supply phosphorus and calcium compounds to provide buffering capacity during the silage fermentation. Special attention is given in the mineral supplement to replace the soluble phosphorus and potassium salts which we were removed from the brewers' wet grain during the brewery mashing process.

The following is a typical analysis of the ingredients of suitable mineral supplements, on a dry weight percent basis:

| | | | |
|---|---|---|---|
| Calcium | 8 | – | 25% |
| Phosphorus | 2 | – | 12% |
| Potassium | 8 | – | 12% |
| Magnesium | 1 | – | 3% |
| Sodium | 0.1 | – | 6% |
| Trace Nutrients | 0.2 | – | 0.8% |

Trace nutrients can include elements such as iodine, cobalt, iron, manganese, copper and zinc, and vitamins. Any suitable compound containing the mineral in a form available to the animal, and carrying GRAS (generally regarded as safe by the FDA) status, may be used as the source of the above minerals. The mineral compounds will normally be combined with a suitable carrier material acceptable for livestock feeds. Using the mineral composition of the brewer's wet grain and other grains and roughage combined therewith in the feed silage compositon along with any other grains and roughage or supplements fed to the animal with the feed silage composition after fermentation, a sufficient quantity of the mineral supplement is mixed with the feed silage composition so as to meet the average daily requirements of livestock in accordance with standards established by the National Research Council.

It has been found that brewer's wet grain, due to its being a water cooked product, is deficient in certain minerals and to provide the necessary nutrient balance in the overall feed composition, the mineral supplement contains the following elements in weight percent based on the total weight of the feed composition (dry basis):

| | General Range | Preferred Range |
|---|---|---|
| Calcium | 0.20 – 4.00 | 0.35 – 0.65 |
| Phosphorus | 0 – 1.00 | 0.10 – 0.30 |
| Potassium | 0.05 – 1.50 | 0.35 – 0.60 |
| Magnesium | 0 – 2.00 | 0.15 – 0.35 |
| Sodium | 0 – 1.00 | 0.30 – 0.50 |

Optional ingredients of the feed silage composition include brewers yeast and roughage. Brewer's yeast may be used as an ingredient in addition to brewer's wet grains to provide an additional source of protein and other nutritional factors if desired. If brewer's yeast is used, the yeast should be inactivated by heat, or salt concentration, or a combination of both treatments so as to render it non-viable or autolyzed. Viable brewer's yeast in the silage mixture would promote an initial fermentation yielding ethyl alcohol from available sugars instead of organic acids which are required for preservation of the silage feed. The brewer yeast fermentation, if not prevented by inactivation, may not be harmful, but would result in moderate loss of feed value through production of unwanted fermentation by-products from available fermentable sugars. Roughage type feeds may be included if higher crude fiber values are required such as for dairy cattle ration; typical roughages include cotton seed hulls, corn cobs, hay, haylage, straw, fodder, bagasse, corn or sorghum silage, corn stalks, soy bean hulls, etc.

The principal factors for selecting the specific silage feed ingredients for blending with the brewers wet grains are moisture, protein, carbohydrate, and mineral. As previously noted, it is important for this invention that the moisture content of the blend of feed ingredients should be less than 58 percent by weight. Moisture levels higher than 58 percent tend to drain away from the silo storage structures with loss of nutritive values, and to promote fermentations which tend to be objectional because of excess acidity or souring, and loss of palatability for livestock. The lower limit of moisture content in the ingredient blend is not critical, in the range of 35 percent to 40 percent. This is the lower moisture range for ingredient mixes that satisfy balanced nutritional requirements for high energy feed rations.

The quantities of the selected ingredients are proportioned at appropriate levels to control the protein and carbohydrate levels in the silage feed blend according to the ration requirements of the livestock to be fed. Protein content of the blend for high producing dairy cattle would be controlled in the range of 15 to 20 percent (dry matter basis) whereas, a similar ration intended for fattening beef cattle would be controlled in the range of 10 to 15 percent protein. Similarly, the feed ingredients for the blend are selected for carbohydrate or energy level according to the ration requirments of the livestock to be fed. The silage composition of the invention, in general, has the following composition in weight percent, dry matter basis, for typical cattle and swine rations:

| | Range |
|---|---|
| Brewer's wet grain | 12 – 70% |
| Feed grain or other carbohydrate energy source | 25 – 80% |
| Mineral Supplement | 1.0 – 5% |

-Continued

| | Range |
|---|---|
| Autolyzed yeast | 0 – 5% |
| Roughage | 0 – 20% |

The silage feed ingredients are mechanically blended together in a manner to achieve a good mixture which is reasonably uniform throughout. The blended mixture of ingredients is then mechanically conveyed, blown, or otherwise transferred into a suitable silo structure. Suitable silo structures include most types in common use on livestock farms which have characteristics adequate for achieving substantially anaerobic fermentation and preservation of the fermented brewers grain silage until it is fed to livestock, such as beef cattle, hogs and dairy cows. The desired type of substantially anaerobic fermentation will proceed in a silo which is not air-tight since the great mass of the feed in the silo will not be exposed to the atmosphere even though the presence of oxygen in the headspace may result in secondary aerobic fermentation in a thin top layer.

2. Fermentation of the feed silage composition.

The next essential step of the process of this invention is the fermentation of the blended feed silage ingredients under substantially anaerobic conditions wich results in a brewer's grain feed composition that possesses good keeping quality, excellent palatability and acceptability by livestock, and improved digestability for efficient utilization by livestock. The fermentation is initiated by microorganisms occurring naturally in the feed ingredients. Both harmful and beneficial organisms are present in the feed ingredients at the time they are blended, but control of moisture content, control of anaerobic fermentation conditions, and control of pH through proper selection of buffering materials in the mineral ingredients predisposes the fermentation to the extent that useful organic acid producing microorganisms will multiply thereby limiting possible growth of harmful microorganisms.

Fermentation occurs spontaneously in the silo structure, and proceeds very rapidly in the first 3 to 7 days after the feed ingredients are placed in the silo. Organic acids are produced by the microorganisms during their growth which causes a rapid drop in pH, to values in the range of 4.0 to 4.5 at which point fermentation subsides, the pH level stabilizes, and the silage is ready for feeding to livestock or continued storage in the silo.

As previously noted, the mineral supplement provides a dual function in that it not only provides the necessary nutrient balance for the composition, but also buffers the pH assuring that the pH will not fall below 4.0 during fermentation and provides a final pH for the fermented product in the range of 4.0 to 4.5. It has been discovered that under natural fermentation, spent brewer's grain, without other additives, will develop a pH well below 4.0, due to the lack of naturally occurring buffering agents. By maintaining the pH above 4.0, the production of desirable acids, such as lactic, is increased. Maintenance of pH in the desirable range of 4.0 to 4.5 improves animal acceptance and intake of the feed composition. Thus, the process of the invention incorporates a high percentage of mineral supplement to not only provide a nutrient balance, but also to maintain the pH above 4.0 during a fermentation and in the finished silage.

An advantage of this invention is the biochemical modification of the silage feed composition, wherein the separate feed ingredients, having been subjected to breakdown as a consequence of the fermentation, are rendered more digestible to livestock. The action of microflora in silage fermentation is somewhat comparable to the biochemical breakdown of feed by microflora which populate the first stomach or rumen of cattle. Therefore, the silage feed composition prepared under this invention has the advantage of having been partially modified or digested prior to intake into the animal. An improvement in feed conversion efficiency by cattle has been achieved, as demonstrated in feeding trials summarized herein.

The role of mineral supplements in the feed ingredient blend for utilization of brewers wet grain was outlined heretofore in relation to correcting mineral imbalance, mineral deficiencies, and the influence of minerals on pH of the fermenting silage through buffering action. Another advantage of this invention pertaining to the inclusion of mineral supplements in the brewers grains silage ingredient formulation is the fact that the minerals are subjected to solubilization in the weak organic acids of the silage; thus, the minerals become more readily available for quick uptake in the digestive processes within the animal after the silage feed has been ingested.

The following examples further illustrate the process and products of this invention. Percentages are expressed on a weight percent basis unless otherwise indicated.

EXAMPLE I

The keeping quality of brewers grain silage prepared according to this invention is demonstrated by the analyses of pH and titrable acidity of samples taken from the silo during feed-out of silage over a 6 month period after silo filling. The silage formulation represented by the following data was, on a dry matter basis, about 38.5 percent brewers wet grain (without yeast), 60.5 percent ground dry corn or hominy feed, and 1 percent mineral supplement of the composition set forth above:

| Approximate Age of Silage | pH of Silage | Analyses - Dry Matter Basis | | | | | |
|---|---|---|---|---|---|---|---|
| | | Protein % | Fat % | Ash % | Fiber % | N.F.E. % | Titrable Acidity* |
| 1 month | 4.5 | 18.3 | 5.8 | 4.1 | 7.1 | 64.7 | 4.0 |
| 2 months | 4.4 | 19.6 | 5.8 | 3.6 | 7.8 | 63.2 | 4.2 |
| 3 months | 4.4 | 18.3 | 6.2 | 3.7 | 8.4 | 63.4 | 4.1 |
| 4 months | 4.3 | 19.3 | 6.6 | 3.8 | 8.4 | 61.9 | 5.5 |
| 5 months | 4.3 | 19.6 | 5.8 | 3.6 | 8.6 | 62.4 | 4.9 |
| 6 months | 4.3 | 19.3 | 6.4 | 3.7 | 8.0 | 62.7 | 4.8 |

* Titrable acidity: ml. N/10 NaOH per gm. of sample, dry matter basis.

EXAMPLE II

The keeping quality of brewers grain silage prepared according to this invention with two different formulations of ingredients including autolyzed brewers yeast, is demonstrated by the analyses of pH and titrable acidity of silage samples taken from the silo during feed-out over 2 and 3 month periods respectively after silo filling. The silage formulations represented by the following data were approximately 50:50 and 75:25 blends, respectively, on an as is basis. The 50:50 blend on a dry matter basis contained about 26 percent brewers wet grain and 72.4 percent ground corn while the 75:25 blend contained about 53.2 percent brewers wet grain and 44.5 percent ground corn on a dry matter basis. Autolyzed brewers yeast was included in the brewers wet grain of both blends at the level of 5 percent yeast dry solids to 95 percent brewers grain dry solids. The 50:50 blend contained 1.6 percent of the mineral supplement of the composition set forth above and the 75:25 blend had 2.3 percent of said mineral supplement, both on a dry matter basis.

The brewers grain silage listed in Table 1 for Lots II and III was a feed composition according to this invention made by the fermentation process described above from a mixture, on a dry matter basis, of about 26 percent brewers wet grain, 72.4 percent corn and 1.6 percent mineral supplement. The mineral supplement consisted of 10 percent calcium, 10 percent phosphorus, 10 percent potassium, 4 percent sodium and 0.69 percent trace nutrients. The brewers wet grain had a moisture content of about 70 percent and included, on a dry matter basis, 5 percent autolyzed brewers yeast solids. This composition was blended together and transferred into a silo; after fermentation as described previously, the resulting fermented mixture was fed to the cattle for 45 days and is designated in the following tables as a "50–50" mix; thereafter it was changed for the balance of the test period to a fermented mixture made from, on a dry matter basis, about 53.2 percent brewers wet grain (also containing 5 percent autolyzed yeast on a dry matter basis) 44.5 percent corn and 2.3 percent of the same mineral supplement used in the 50:50 mix, which is designated as the "75–25" mix in the following tables.

| Approximate Age of Silage | pH of Silage | Analyses - Dry Matter Basis | | | | | Titrable Acidity* |
|---|---|---|---|---|---|---|---|
| | | Protein % | Fat % | Ash % | Fiber % | N.F.E. % | |
| 50:50 Mix | | | | | | | |
| one week | 4.5 | 14.3 | 4.5 | 3.7 | 5.2 | 68.8 | 1.9 |
| one month | 4.3 | 14.6 | 4.2 | 3.2 | 4.8 | 73.2 | 3.4 |
| two months | 4.2 | 14.7 | 3.9 | 3.7 | 4.8 | 72.9 | 3.5 |
| 75:25 Mix | | | | | | | |
| one week | 4.0 | 19.1 | 4.6 | 4.5 | 9.0 | 62.8 | 3.6 |
| one month | 4.1 | 19.6 | 5.0 | 4.5 | 8.3 | 62.6 | 6.2 |
| two months | 4.2 | 19.3 | 5.2 | 4.5 | 8.6 | 62.4 | 6.3 |
| three months | 4.3 | 20.7 | 5.0 | 4.5 | 8.1 | 61.7 | 6.1 |

*Titrable acidity: ml. N/10 NaOH per gm. of sample, dry matter basis.

EXAMPLE III

Sixty-four Angus Hereford crossbred beef steers of choice quality were divided into three lots and underwent a typical 21 day starting and conditioning feed period in which their ration included supplemental mineral, vitamin and antibiotic fortification to overcome normal stress and disease often encountered in starting cattle. Thereafter, the cattle were weighed and put on three different feeding programs according to the following Table I, the feed rations being expressed as the average pounds of feed per head per day (on an as fed basis)

Table 1

| | Lot I (21 cattle) | Lot II (21 cattle) | Lot III (22 cattle) |
|---|---|---|---|
| Corn silage | 20.4 | 12.3 | — |
| Corn | 10.7 | 7.4 | 8.8 |
| Brewers Grain Silage | — | 18.3 | 21.1 |
| Hay | 1.8 | — | — |
| Hay Pellets | — | — | 2.0 |
| Protein Supplement | 1.0 | — | — |
| Ruminant Supplement | — | 0.50 | 0.50 |

The ration for Lot I was a typical high quality cornbelt beef cattle feed ration in which the supplement contained urea as a partial source of nitrogen.

Table 2 sets forth the feeding programs of Table 1 on a dry matter basis, again based upon the average intake per head per day:

Table 2

| | Lot I (%) | Lot II (%) | Lot III (%) |
|---|---|---|---|
| Brewers Grain Silage | | | |
| (a) 50–50 mix | — | 20.3 | 22.9 |
| (b) 75–25 mix | — | 29.1 | 33.1 |
| Corn Silage | 37.5 | 24.2 | 7.1 |
| Hay | 8.4 | .08 | .08 |
| Hay Pellets | — | — | 6.9 |
| Corn | 49.3 | 23.0 | 26.5 |
| Ruminant Supplement[1] | — | 2.46 | 2.43 |
| Protein Supplement[1] | 4.59 | — | — |
| salt[2] | .05 | .03 | .08 |
| mineral[2] | .14 | .05 | .14 |

1. Protein supplement listed in feed ration for Lot I of Example III and Ruminant supplement in feed ration for Lots II and III of Example III, and also in the feed ration for Example IV were supplements which were added to the overall ration at time of feeding. Protein supplement used in Lot I contained urea as a supplemental source of nitrogen plus the growth promoting factor diethylstilbestrol, supplemental vitamins, and trace minerals. Ruminant supplement used in Lots II and III contained diethylstilbestron, supplemental vitamins, and trace minerals. These supplements were formulated and fed to provide vitamins, and trace minerals in accordance with National Research Council standards.

2. available on a free choice basis.

Depending upon degree of finish attained during the feeding period, some of the cattle were sold after 92 days on the foregoing feed schedule, others after 121 days, and the balance after 139 days. Table 3 summarizes the data as to feed efficiency expressed as the pounds of feed consumed per pound of weight gain by the cattle, and rate of weight gain expressed as the pounds of weight gain per day for Lots I, II, and III based upon cattle-days on feed calculation.

Table 3

|  | Lot I | Lot II | Lot III |
|---|---|---|---|
| Pounds of Feed used (dry matter basis) | 54,696 | 46,134 | 48,287 |
| Total lbs. gained by cattle | 7,212 | 7,048 | 8,193 |
| Average daily gain | 2.51 | 2.73 | 3.07 |
| Pounds of Feed/ pound of gain | 7.58 | 6.54 | 5.89 |

From Table 3, it can be seen that the use of the feed of this invention in Lots II and III gave an increase, of about 9 to 22 percent, over the average daily gain of the cattle of Lot I. Further, there was a significant increase in the feed efficiency in that the cattle of Lots II and III exhibited about 14 and 22 percent, respectively, reduction in the pounds of feed required to produce a pound of gain. The economic impact of this degree of improvement is presented in Table 4 which indicates an enhanced dollar return per steer is attainable with the use of the brewers grain feed according to this invention.

Table 4

SUMMARY OF FEEDING COSTS AND VALUE OF GAIN

|  | Lot I | Lot II | Lot III |
|---|---|---|---|
| No. of Steer | 21 | 21 | 22 |
| Gain in pounds | 7212 | 7048 | 8193 |
| Feed Cost | $1,215.42 | $1,194.35 | $1,275.22 |
| Cost/lb. Gain | 16.85 | 16.95 | 15.56 |
| Value of Carcasses[1] | $5,676.15 | $5,777.99 | $6,503.02 |
| Cost of Cattle[2] | $3,535.86 | $3,527.69 | $3,888.28 |
| Value of Gain/per dollar of feed cost | $1.58 | $1.73 | $1.82 |
| Dollar Return/Steer | $ 37.27 | $ 45.22 | $ 53.59 |

(1) Actual live weight prices received adjusted to value of carcasses
(2) Includes vaccinations, trucking and buying commissions The feed values used in the calculations of Table 4, all expressed on a dollar/ton as is basis were; brewers wet grain silage (50-50 mix), $31.50; brewers wet grain silage (75-25 mix), $24.10; corn silage, $9.50; hay, $20.00; hay pellets, $30.00; corn, $45.00; mineral supplement, $148.00; starting concentrate, $220.00; protein supplement, $133.00; ruminant supplement, $148.00; minerals, free choice, $156.00; and salt $20.00. The foregoing prices for brewers grain silage were calculated on the basis of $15.00/ton, delivered to feed lot for fermentation, for brewers wet grains and yeast containing 70 percent moisture and 30 percent dry matter.

The quality of carcasses from all lots was excellent with over 90 percent of carcasses grading U.S.D.A. Choice or better. Carcass evaluation data showed nonsignificant differences between lots with respect to dressing percentage, fat thickness over loin, kidney-pelvic-heart fat percentage, and texture, color and firmness of lean. The brewers grain silage fed cattle of Lots II and III produced carcasses which were superior with respect to fat color, marbling and distribution as shown in the rib eye muscle and throughout the meat; the fat was described as snow-white in color.

The cattle of Lots II and III fed with the feed of this invention also displayed a significant reduction in feeding time to reach choice grade. Average days on feed prior to marketing in Example III were as follows:

|  | Lot I | Lot II | Lot III |
|---|---|---|---|
| Days on feed to market | 137 | 123 | 121 |

EXAMPLE IV

A dairy herd which had been fed a ration averaging about 60 pounds of corn silage, 10–12 pounds of hay and 25 pounds of dairy mix per head per day was switched to a feed including a sizable portion of livestock feed produced according to this invention. A composition comprising, on a dry matter basis, 33 percent wet brewers grain (supplied with 70 percent moisture), 64 percent mixed corn and wheat, and 3 percent of mineral supplement of the composition used in Example III was thoroughly mixed and fermented and stored in a conventional concrete silo according to the process described above. The fermented brewers grain silage was withdrawn on a daily basis after fermentation was completed and used in the following daily ration:

| Fermented brewers grain silage | 25 lbs. |
|---|---|
| Corn Silage | 45 lbs. |
| Hay | 15 lbs. |
| Dairy mix (14% protein) | 10 lbs. |
| Ruminant Supplement[1] | 0.5 lbs. |

[1] Ruminant supplement of same composition as in Example III, except without diethylstilbestrol for feeding dairy cows.

The herd was put on the above ration and their milk production and feed costs were noted for a 5 month period to provide the results listed in Table 5, using the testing procedures the Dairy Herd Improvement Association.

Table 5

Dairy Herd Improvement Association Records

Current Monthly Rate:

| Month | No. of Cows | % in Milk | Daily Ave. per Cow | | | Feed Cost per cwt. Milk |
|---|---|---|---|---|---|---|
| | | | lbs. Milk | Butterfat % | lbs. | |
| Prior month-2 | 45 | 75 | 22.4 | 3.3 | 0.76 | $ 3.13 |
| Prior month-1 | 48 | 73 | 25.4 | 3.2 | 0.83 | 3.00 |
| Month 1 | 48 | 81 | 32.3 | 3.2 | 1.06 | 2.11 |
| Month 2 | 50 | 83 | 34.8 | 3.3 | 1.17 | 1.96 |
| Month 3 | 52 | 84 | 38.4 | 3.5 | 1.38 | 1.96 |
| Month 4 | 48 | 85 | 41.1 | 3.6 | 1.52 | 1.90 |
| Month 5 | 44 | 91 | 43.2 | 3.8 | 1.67 | 1.87 |

Rolling Yearly Herd Average:                    Yearly Ave. per Cow

| | | | | | | |
|---|---|---|---|---|---|---|
| Prior month-2 | 45.8 | 84 | 10,845 | 3.6 | 396 | 2.18 |
| Prior month-1 | 45.4 | 85 | 10,882 | 3.6 | 392 | 2.19 |
| Month 1 | 45.4 | 85 | 10,933 | 3.5 | 391 | 2.20 |
| Month 2 | 45.4 | 85 | 11,173 | 3.5 | 397 | 2.17 |
| Month 3 | 45.8 | 85 | 11,433 | 3.5 | 405 | 2.15 |
| Month 4 | 46.0 | 84 | 11,791 | 3.5 | 419 | 2.13 |
| Month 5 | 45.9 | 85 | 12,104 | 3.5 | 433 | 2.11 |

Several observations made during the course of the testing set forth in this example are of importance towards emphasizing further useful features of a feed according to this invention.

1. Because brewers wet grain has a relatively fixed composition, it is possible for the cattle to be fed a ration of essentially constant mixture throughout the feeding period when the brewers grain silage made according to the process set forth herein is used as all or a major portion of the animals' feed. This is in distinction to the usual cornbelt or similar cattle feed ration which includes one or more types of feed grains which can vary considerably in composition throughout the feeding period. Thus, it is possible to reduce digestive disturbances in the animals and exert greater control over the feed composition when employing feed according to the present invention, particularly in that a sizable portion of the animal ration can be have the same composition throughout the feeding period.

2. It has further been observed that it is possible to reduce the starting and conditioning period for cattle through the use of the brewers grain silage of the present invention. Although the cattle in the three Lots set forth in Example III were all put on a 21 day starting and conditioning period for the purposes of conducting suitable comparative experiment it has been noted that while a conditioning period of this length of time is normally required for the usual cornbelt feed ration, a shorter period can be used when animals are fed the feed of the present invention. Cattle start on the fermented wet brewers grains feed disclosed herein easier because of the enhanced palatability of the mixture and because optimum levels of essential nutrients which are required for maximum production of healthy rumen micro flora are supplied in the present brewers wet grain silage ration. Thus, the latter mixture may include yeast, bacteria and trace nutrients known to be required for optimum micro floro production during the entire feed period. The common digestive disturbances which cause cattle to go off feed are reduced or eliminated with the feed of this invention and this has the effect of producing increased feed efficiency and increased average daily gains. In feeding trails with both beef and dairy cattle, the animals have been quickly changed to brewers grain silage from various other feed rations without difficulty.

3. It has been found that 10–15 percent gain in milk production can be achieved with the feed of the present invention, and that feed costs can be reduced, both in comparison to normal dairy cow rations. It has been noted that cows are able to maintain a high level of production utilizing the feed of the present invention once it has been achieved. Experience with dairy cows also indicated they become conditioned to fermented brewers grain feed in a shorter time than is the case with normal cow feeds and that the lack of or reduction in seasonal changes in the feed content is an important and valuable factor in dairy cattle.

4. Feeding programs for livestock production using the feed of this invention as a substantial proportion of the nutritional requirements of livestock for meat and milk production can minimize the land requirements of the cattle raiser or dairy herd owner for supporting crop production. It is contemplated that the user of the feed will have an on-site silo that will be supplied periodically with the brewers wet grain, mineral supplement, carbohydrate materials and other ingredients for fermentation therein, and that the fermented feed mixture will be stored in the silo for withdrawal as required by his particular livestock herd.

Various modes of carrying out the invention are contemplated as being within the scope of the following claims particularly pointing out and distinctly claiming the subject matter which is regarded as the invention.

We claim:

1. A method of preparing a livestock feed composition comprising the steps of, reducing the moisture content of brewer's wet grain having a moisture content of over 80 percent by weight to a value of below 70 percent by weight, intimately mixing the brewer's wet grain of the reduced moisture content, a high-carbohydrate livestock feed material and a mineral supplement containing buffering compounds to provide a blend having a moisture content of 35 percent to about 58 percent by weight, said blend containing on a dry basis from 12 to 70 percent by weight of said brewer's wet grain, 25 to 80 percent by weight of said carbohydrate feed material and 1 to 5 percent by weight of said mineral supplement and having a protein content above 10 percent by weight on a dry basis, fermenting the blend under substantially anaerobic conditions to provide a fermented silage; and buffering the pH of the silage through the action of the buffering compounds in the mineral supplement during fermentation so that the silage has a pH in the range of 4.0 to 4.5, said silage having improved palatability to the livestock and increased stability against spoilage.

2. The method of claim 1, wherein up to 5 percent by weight of autolyzed brewer's yeast and up to 20 percent by weight of livestock roughage are added to the blend.

3. The method of claim 1, wherein said mineral supplement contains the following elements in weight percent based on the total weight of the blend (dry basis):

| | |
|---|---|
| Calcium | 0.20 – 4.00 |
| Phosphorus | 0 – 1.00 |
| Potassium | 0.05 – 1.50 |
| Magnesium | 0 – 2.00 |
| Sodium | 0 – 1.00 |

4. The method of claim 1, wherein the brewer's wet grain has an intial moisture content of 80 to 90 percent by weight and the moisture content is reduced by a mechanical process to a value of 65 to 70 percent by weight.

5. A method of preparing a livestock feed composition comprising the steps of, reducing the moisture content of brewer's wet grain having a moisture content of over 80 percent by weight to a value of 65 to 70 percent by weight, intimately mixing the brewer's wet grain of the reduced moisture content, a high-carbohydrate livestock feed material, and a mineral supplement to provide a blend having a moisture content of less than about 58 percent by weight, said blend containing on a dry basis from 12 to 70 percent by weight of said brewer's wet grain and 25 to 80 percent by weight of said carbohydrate feed material and from 1 to 5 percent of the mineral supplement, said blend having a protein content in the range of 10 to 20 percent by weight on a dry basis, said mineral supplement containing the following elements in weight percent based on the total weight of the blend.

| | |
|---|---|
| Calcium | 0.20 – 4.00 |
| Phosphorus | 0 – 1.00 |
| Potassium [0.50] | 0.05 – 1.50; | and fermenting the blend under substantially anaerobic conditions to provide a fermentated silage; said mineral supplement acting up supply the necessary nutrient balance and buffer the pH of the silage during fermentation so that the silage has a pH above 4.0 during fermentation and the fermented silage has a pH in the range of 4.0 to 4.5, said silage having improved palatability to the livestock and increased stability against spoilage.

6. A livestock feed mixture to be naturally fermented under substantially anaerobic conditions, comprising on a dry basis from about 12 to 70 percent by weight of partially dewatered brewer's wet grain containing less than about 70 percent moisture by weight, from about 25 to 80 percent by weight of a carbohydrate feed material, and from 1 to 5 percent by weight of a mineral supplement, said mixture having a moisture content of 35 percent to about 58 percent by weight, said mineral supplement being present in an amount sufficient to supply the necessary nutrient balance to the composition, said mineral supplement containing an element selected from the group consisting of calcium and phosphorus in an amount sufficient to maintain the pH of the mixture above 4.0 during fermentation and to maintain the pH of the fermented mixture in the range of 4.0 to 4.5.

7. The feed mixture of claim 6, and including up to 5 percent by weight of autolyzed brewer's yeast and up to 20 percent by weight of livestock roughage.

8. The feed mixture of claim 6, wherein said mineral supplement contains from 0.05 to 1.50 percent by weight of potassium based on the total weight of the dry feed mixture.

9. The feed mixture of claim 6, wherein the mineral supplement contains from 0.20 to 4.00 percent by weight of calcium and 0 to 1.00 percent by weight of phosphorus based on the total weight of the dry feed mixture.

* * * * *

UNITED STATES PATENT OFFICE
CERTIFICATE OF CORRECTION

PATENT NO. : 3,875,304
DATED : April 1, 1975
INVENTOR(S) : LENARD A. HUNT and EUGENE G. SPITZER It is certified that error appears in the above-identified patent and that said Letters Patent are hereby corrected as shown below:

Column 9, line 2   Cancel "diethylstilbestron" and substitute therefor ---diethylstilbestrol---,
Column 11, line 38  Cancel "be"

Column 14, line 3  Cancel "up" and substitute therefor ---to---

Signed and Sealed this second Day of September 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,875,304  Dated April 1, 1975

Inventor(s) Lenard A. Hunt et al.

It is certified that error appears in the above-identified patent and that said Letters Patent are hereby corrected as shown below:

Column 13, line 39, after "Potassium" cancel "[0.50]"

Signed and Sealed this ninth Day of December 1975

[SEAL]

Attest:

RUTH C. MASON
*Attesting Officer*

C. MARSHALL DANN
*Commissioner of Patents and Trademarks*